US012584339B2

(12) United States Patent
Peterlunger et al.

(10) Patent No.: US 12,584,339 B2
(45) Date of Patent: Mar. 24, 2026

(54) FURNITURE DRIVE

(71) Applicant: Julius Blum GmbH, Hoechst (AT)

(72) Inventors: Alexander Peterlunger, Lustenau (AT); Stephan Hetzinger, Schorndorf (DE); Markus Singer, Plochingen (DE); Albrecht Kreissig, Stuttgart (DE); Tobias Waibel, Ostfildern (DE)

(73) Assignee: JULIUS BLUM GMBH, Hoechst (AT)

(*) Notice: Subject to any disclaimer, the term of this patent is extended or adjusted under 35 U.S.C. 154(b) by 80 days.

(21) Appl. No.: 18/119,585

(22) Filed: Mar. 9, 2023

(65) Prior Publication Data

US 2023/0212900 A1 Jul. 6, 2023

Related U.S. Application Data

(63) Continuation of application No. PCT/AT2021/060385, filed on Oct. 15, 2021.

(30) Foreign Application Priority Data

Oct. 22, 2020 (AT) .............................. A 50906/2020

(51) Int. Cl.
*E05F 1/10* (2006.01)
*E05F 3/04* (2006.01)

(52) U.S. Cl.
CPC ................ *E05F 1/105* (2013.01); *E05F 3/04* (2013.01); *E05Y 2201/256* (2013.01);
(Continued)

(58) Field of Classification Search
CPC ..... E05F 1/105; E05F 3/04; E05F 5/02; E05F 1/1058; E05F 1/1276; E05F 1/1261;
(Continued)

(56) References Cited

U.S. PATENT DOCUMENTS 9,364,132 B2 * 6/2016 Gherardi ............... E05F 1/1261
9,464,473 B2 10/2016 Baldreich
(Continued)

FOREIGN PATENT DOCUMENTS

CN 104136700 11/2014
CN 108643736 A * 10/2018 ......... E05D 11/1021
(Continued)

OTHER PUBLICATIONS

EP 2607590 A2 translation (Year: 2013).*
International Search Report issued Jan. 25, 2022 in International (PCT) Application No. PCT/AT2021/060385.

*Primary Examiner* — Hiwot E Tefera
(74) *Attorney, Agent, or Firm* — WENDEROTH, LIND & PONACK, L.L.P.

(57) ABSTRACT

A furniture drive for moving a furniture part movably supported relative to a furniture carcass. The furniture drive includes a carrier to be fixed to the furniture carcass, an actuating arm pivotally supported relative to the carrier about a pivoting axis between a closed position and a maximum opening position, and an adjustment device configured to adjust a position of the maximum opening position of the at least one actuating arm. The adjustment device includes a pivoting member configured to be moved in at least two pivoting positions relative to the actuating arm, and the pivoting member is configured to distance the actuating arm in the at least two pivoting positions to a different extent from an abutment arranged on the carrier when the actuating arm is arranged in the maximum opening position.

24 Claims, 6 Drawing Sheets

(52) U.S. Cl.
CPC ... *E05Y 2201/474* (2013.01); *E05Y 2201/624* (2013.01); *E05Y 2600/56* (2013.01); *E05Y 2600/58* (2024.05); *E05Y 2900/20* (2013.01)

(58) Field of Classification Search
CPC ......... E05Y 2201/256; E05Y 2201/474; E05Y 2201/624; E05Y 2900/20; E05Y 2201/25; E05Y 2201/618; E05Y 2600/56; E05Y 2600/58; E05D 15/401; E05D 11/06
See application file for complete search history.

(56) References Cited

U.S. PATENT DOCUMENTS

| | | | | |
|---|---|---|---|---|
| 10,428,568 | B2 | 10/2019 | Brunnmayr | |
| 10,968,672 | B2 | 4/2021 | Schmid | |
| 2005/0218383 | A1* | 10/2005 | Hirtsiefer | E05F 1/1261 254/1 |
| 2007/0067955 | A1* | 3/2007 | Jing | E05F 1/1276 16/286 |
| 2010/0162847 | A1* | 7/2010 | Gassner | E05F 15/605 74/490.07 |
| 2012/0084944 | A1* | 4/2012 | Hirtsiefer | E05D 15/46 16/349 |
| 2016/0333620 | A1* | 11/2016 | Holzapfel | E05F 1/1058 |
| 2017/0204645 | A1* | 7/2017 | Lubetz | F16H 25/18 |
| 2018/0291665 | A1* | 10/2018 | Güzeltepe | E05D 15/401 |
| 2018/0363346 | A1* | 12/2018 | Holzapfel | E05F 1/1075 |
| 2018/0363348 | A1* | 12/2018 | Schluge | E05F 1/1058 |
| 2019/0003229 | A1* | 1/2019 | Brunnmayr | E05F 1/1246 |
| 2019/0093404 | A1* | 3/2019 | Schmid | E05F 1/1058 |
| 2019/0169904 | A1* | 6/2019 | Hu | E05F 3/20 |
| 2020/0063484 | A1* | 2/2020 | Haemmerle | E05F 3/20 |
| 2020/0131828 | A1* | 4/2020 | Kaiser | E05F 1/1058 |
| 2022/0018174 | A1 | 1/2022 | Güzeltepe et al. | |
| 2022/0056747 | A1* | 2/2022 | Holzapfel | E05F 1/1041 |
| 2022/0259905 | A1* | 8/2022 | Hirtsiefer | E05D 3/06 |
| 2023/0358087 | A1* | 11/2023 | Kroess | E05F 1/1041 |

FOREIGN PATENT DOCUMENTS

| | | | | |
|---|---|---|---|---|
| CN | 109415920 | | 3/2019 | |
| DE | 296 16 978 | | 1/1997 | |
| DE | 10203269 | A1 * | 8/2003 | E05F 1/10 |
| EP | 2 607 590 | | 6/2013 | |
| JP | 2005-133330 | | 5/2005 | |
| JP | 2019-511653 | | 4/2019 | |
| WO | 2017/219055 | | 12/2017 | |
| WO | 2020/112058 | | 6/2020 | |

* cited by examiner

FURNITURE DRIVE

BACKGROUND OF THE INVENTION

The present invention relates to a furniture drive for moving a furniture part, in particular a furniture flap, movably supported relative to a furniture carcass. The furniture drive includes at least one carrier configured to be fixed to the furniture carcass, at least one actuating arm pivotally supported relative to the carrier about a pivoting axis between a closed position and a maximum opening position, and at least one adjustment device configured to adjust a position of the maximum opening position of the at least one actuating arm.

Moreover, the invention concerns an item of furniture comprising furniture carcass, a furniture part, in particular a furniture flap, movably supported relative to the furniture carcass, and a furniture drive of the type to be described for moving the movably supported furniture part.

By the aforementioned adjustment device of the furniture drive, the maximum opening position of the actuating arm and, therewith, the maximum opening position of the furniture part connected to the actuating arm can be adjusted. By limiting the maximum opening position of the actuating arm, collisions of the movable furniture part with laterally adjacent cabinets or with a room ceiling can be prevented.

WO 2017/219055 A1 discloses a furniture fitting for moving a movably supported furniture flap, and an adjustment device for limiting a maximum opening angle of the actuating arm to be connected to the furniture flap is provided. The actuating arm is pivotably supported relative to a carrier via a plurality of levers, the carrier being configured to be fixed to the furniture carcass. The adjustment device for limiting a maximum opening angle of the actuating arm includes an actuating element which is pivotally supported on a first lever and which can be supported on a second lever. A drawback is the fact that two levers therefore have to be provided, the two levers being movable relative to each other. Therefore, it is desirable that the adjustment device can also be applied to furniture drives having only one actuating arm.

SUMMARY OF THE INVENTION

It is an object of the present invention to propose a furniture drive of the type mentioned in the introductory part, thereby avoiding the above-discussed drawbacks.

According to the invention, the at least one adjustment device includes at least one pivoting member configured to be moved in at least two pivoting positions relative to the at least one actuating arm. The at least one pivoting member is further configured to distance the at least one actuating arm in the at least two pivoting positions to a different extent from at least one abutment arranged on the carrier when the at least one actuating arm is arranged in the maximum opening position.

In other words, with the aid of a pivoting member configured to be moved into at least two different pivoting positions, a different spacing of the at least one actuating arm relative to an abutment arranged on the carrier can be provided. In this way, it is not mandatorily necessary to provide a further actuating arm for supporting the at least one actuating arm. Therefore, the number of components and the material consumption of the furniture drive can be reduced.

According to a preferred embodiment, the at least one pivoting member is pivotally supported on the at least one actuating arm. In this way, no additional supporting elements for supporting the pivoting member are required. Moreover, the pivoting member can be thereby entrained with the actuating arm, thereby allowing an intuitive adjustment of the maximum opening position of the actuating arm.

BRIEF DESCRIPTION OF THE DRAWINGS

Further details and advantages of the present invention will be explained with the aid of the embodiment shown in the drawings, in which.

DETAILED DESCRIPTION OF THE INVENTION

Figure 1A:
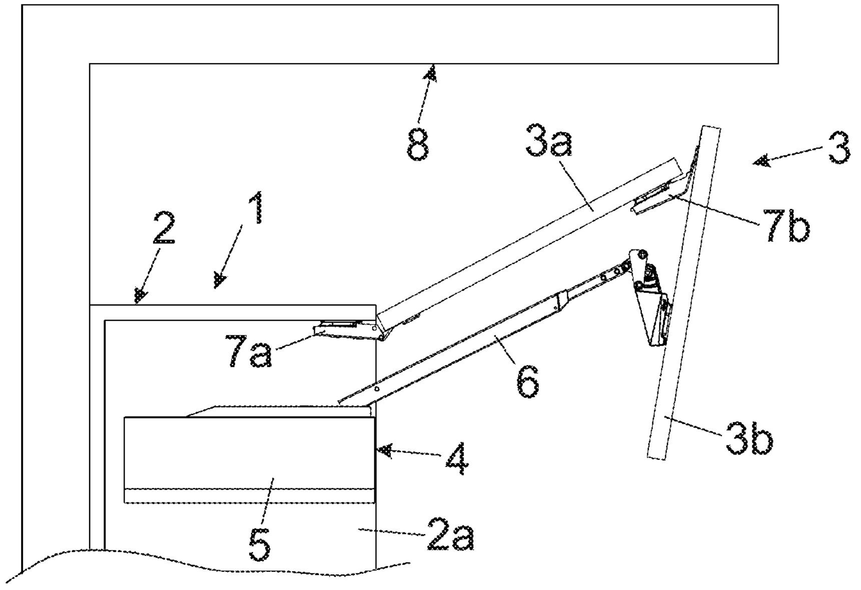
FIG. 1*a*-1*c* show a furniture drive fixed to a furniture carcass with different maximum opening positions of the at least one actuating arm.
Figure 1B:
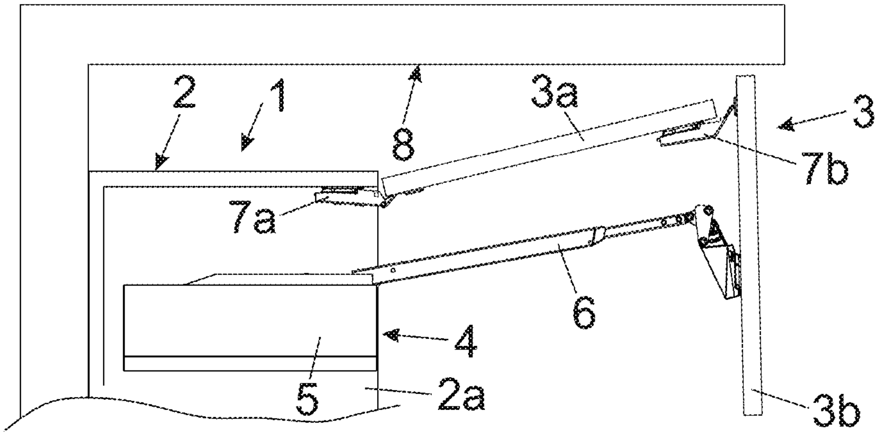
Figure 1C:
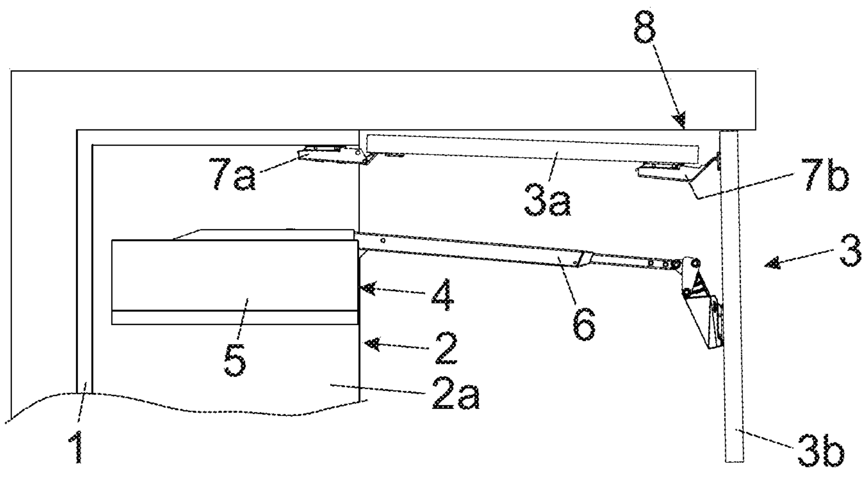

FIG. 1*a*-1*c* show an item of furniture 1 comprising a furniture carcass 2, and a furniture drive 4 for moving a movably supported furniture part 3 is fixed to a sidewall 2*a* of the furniture carcass 2.

In the shown embodiment, the movable furniture part 3 includes two furniture flaps 3*a*, 3*b*. A first furniture flap 3*a* is pivotally connected via at least two hinges 7*a* to the furniture carcass 2 about a horizontally extending pivoting axis, and the second furniture flap 3*b* is pivotally connected via at least two hinges 7*b* to the first furniture flap 3*a* about a horizontally extending pivoting axis.

The furniture drive 4 includes a carrier 5 configured to be fixed to the furniture carcass 2, preferably to a sidewall 2*a* of the furniture carcass 2. The furniture drive 4 further includes at least one actuating arm 6 configured to be pivot relative to the carrier 5, the at least one actuating arm 6 being configured to be connected to the furniture part 3, preferably to the second furniture flap 3*b*.

It can be seen that the item of furniture 1 in FIGS. 1*a*-1*c* adopts different height positions relative to a room ceiling 8. In FIG. 1*a*, the item of furniture 1 is located in a deepest position, in FIG. 1*b* in an intermediate position, and in FIG. 1*c* in a highest position relative to the room ceiling 8. In FIG. 1*a*, the actuating arm 6 thus adopts a largest pivoting angle, in FIG. 1*b* an intermediate pivoting angle, and in FIG. 1*c* a smallest pivoting angle relative to the carrier 5.

In order to avoid a collision of the movable furniture part 3 with the room ceiling 8, the furniture drive 4 includes an adjustment device 9 (FIG. 3*b*) which is yet to be described. By the adjustment device 9, a position of the maximum opening position of the actuating arm 6 can be adjustably limited. In this way, the maximum opening position of the actuating arm 6 can be adapted to the installation situations as shown in FIGS. 1*a*-1*c*.

Figure 2A:
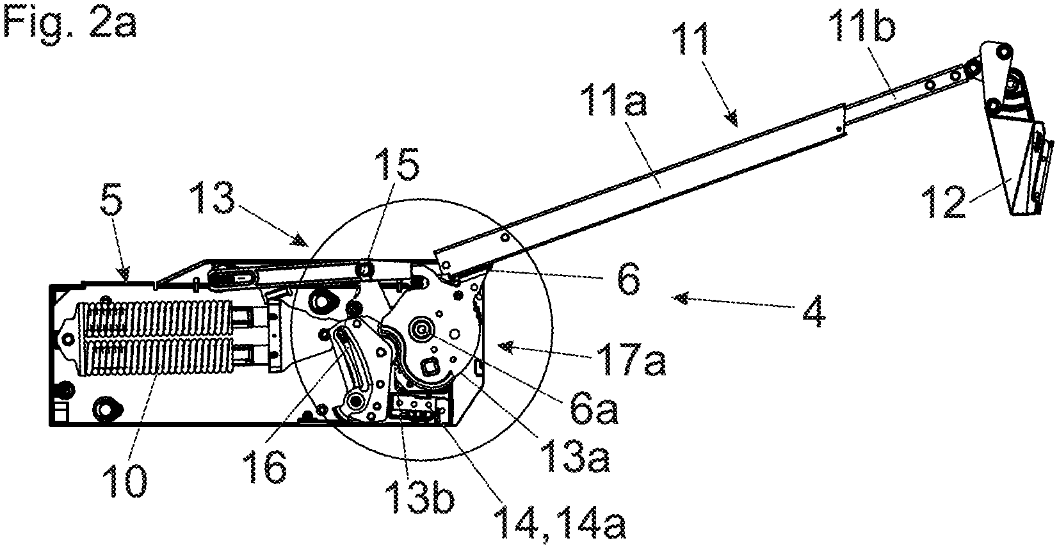
FIG. 2*a*, 2*b* show the furniture drive in a side view and an enlarged detail view thereof.

FIG. 2*a* shows the furniture drive 4 in a side view. The furniture drive 4 includes a carrier 5 configured to be fixed to the furniture carcass 2, and at least one actuating arm 6 pivotally supported on the carrier 5 about a pivoting axis 6*a*.

In the shown embodiment, the actuating arm 6 is releasably arranged on an actuating arm extension 11, the actuating arm extension 11 having two actuating arm members 11*a*, 11*b* displaceable relative to one another. It can be preferably provided that the actuating arm members 11*a*, 11*b* are telescopically displaceable relative to one another, and the first actuating arm member 11*a* is configured to be releasably connected to the actuating arm 6. The second actuating arm member 11*b* includes a fastening device 12 configured to be releasably connected to a fitting portion to be fixed to the movable furniture part 3. Preferably, the fastening device 12 can be locked to and unlocked from the fitting portion without the use of a tool.

For applying a force to the actuating arm 6, a spring device 10 is provided. The spring device 10 can include, for example, at least one helical spring, preferably at least one compression spring. Alternatively, the spring device 10 can also include other force storage members, such as a fluid reservoir in the form of a gas-pressure spring for example.

The furniture drive 4 includes a transmission mechanism 13 for transmitting a force from the spring device 10 to the at least one actuating arm 6. It can be preferably provided that the transmission mechanism 13 includes a control curve 13*a* and a pressure roller 13*b* pressurized by the spring device 10, and the pressure roller 13*b* is configured to run along the control curve 13*a* upon a movement of the at least one actuating arm 6.

According to a preferred embodiment, the control curve 13*a* can be arranged or formed on the actuating arm 6. Of course, it is also possible to arrange the control curve 13*a* on a different location within the transmission mechanism 13.

By a force adjustment device 14, a force of the spring device 10 to the at least one actuating arm 6 can be adjusted. Preferably, the force adjustment device 14

- includes at least one rotatably supported adjustment wheel 14*a*, and a force of the spring device 10 acting on the at least one actuating arm 6 can be adjusted by a rotation the adjustment wheel 14*a*, and/or
- includes at least one threaded spindle 16 along which an engagement location 15 of the spring device 10 is movable upon an actuation of the force adjustment device 14, and/or
- the carrier 5 includes a front face 17 (FIG. 3*b*) having at least one opening 17*a* through which the at least one actuating arm 6 projects in an open position, and an adjustment wheel 14*a* of the force adjustment device 14 is configured to be actuated through the opening 17*a* from a direction X (FIG. 3*b*) extending transversely to the front face 17.

Figure 2B:
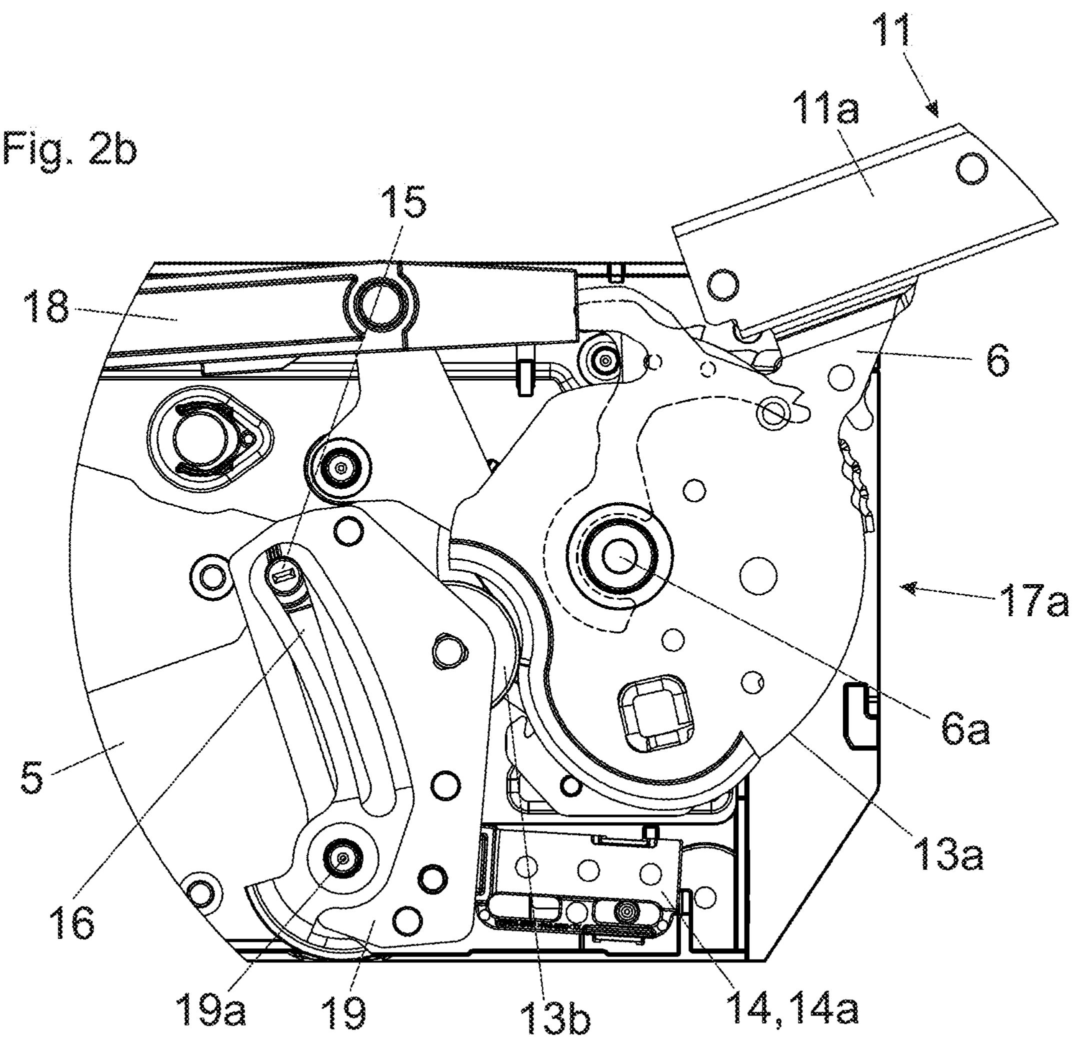

FIG. 2*b* shows the encircled region of FIG. 2*a* in an enlarged view. The transmission mechanism 13 includes an intermediate lever 19 pivotally supported on the carrier 5 about a pivoting axis 19*a*. The threaded spindle 16 is supported on the intermediate lever 19. By rotating the adjustment wheel 14*a* of the force adjustment device 14 with the aid of a tool, the threaded spindle 16 can be rotated. As a result, the engagement location 15 of the spring device 10 is movable along the threaded spindle 16. In this way, the relative distance between the engagement location 15 and the pivoting axis 19*a* of the intermediate lever 19 and thus the torque of the spring device 10 acting on the actuating arm 6 can be increased and decreased.

The furniture drive 4 further includes a at least one damping device 18 for dampening a movement of the at least one actuating arm 6. Preferably, the damping device 18

- is configured as a fluid damper, and/or
- includes at least one piston-cylinder-unit, and/or
- can be pressurized by the at least one actuating arm 6 upon a closing movement, and/or
- can be pressurized from the same side both upon an opening movement and upon a closing movement of the at least one actuating arm 6.

Figure 3A:
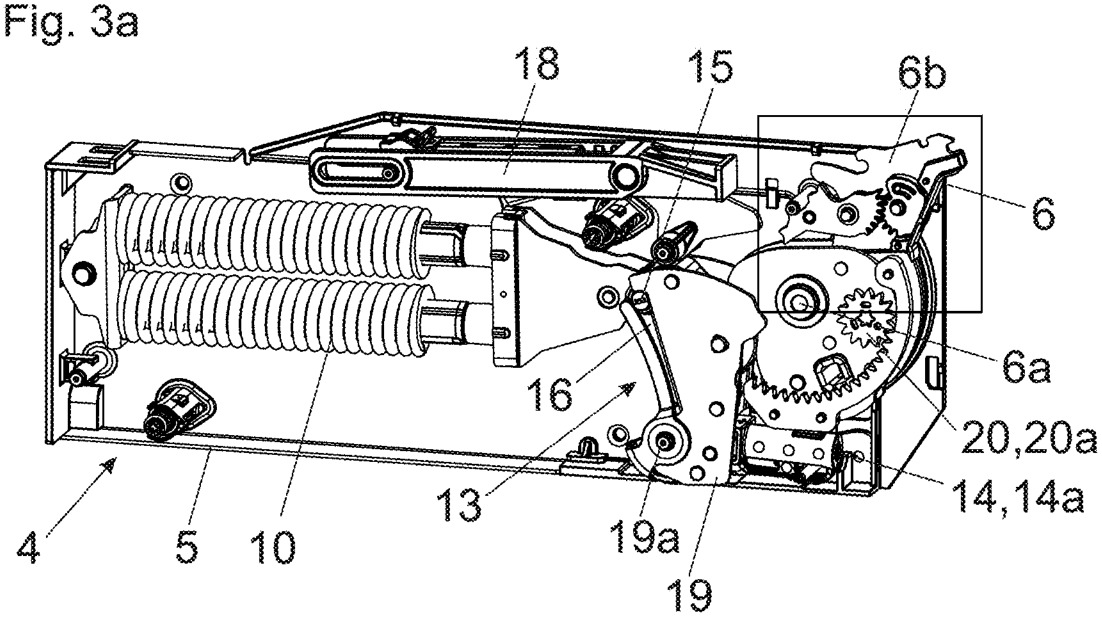
FIG. 3*a*, 3*b* show the furniture drive in a perspective view and an enlarged detail view thereof.

FIG. 3*a* shows the furniture drive 4 in a perspective view. A force of the spring device 10 to the at least one actuating arm 6 can be transmitted by the transmission device 13. The force adjustment device 14 can include, for example, a rotatable adjustment wheel 14*a*. By rotating the adjustment wheel 14*a*, the engagement location 15 of the spring device 10 can be adjusted along the threaded spindle 16 so to adjust the torque acting on the actuating arm 6.

Moreover, the furniture drive 4 can include a mounting securing device 20 for the vacant actuating arm 6 to which the movable furniture part 3 has not yet been fitted. The mounting securing device 20 is configured to limit an opening speed of the vacant actuating arm 6, and the mounting securing device 20 prevents an inadvertent opening or kicking-out movement of the vacant actuating arm 6 caused by a force of the spring device 10. It can be preferably provided that the mounting securing device 20 includes at least one centrifugal clutch 20*a*.

Figure 3B:
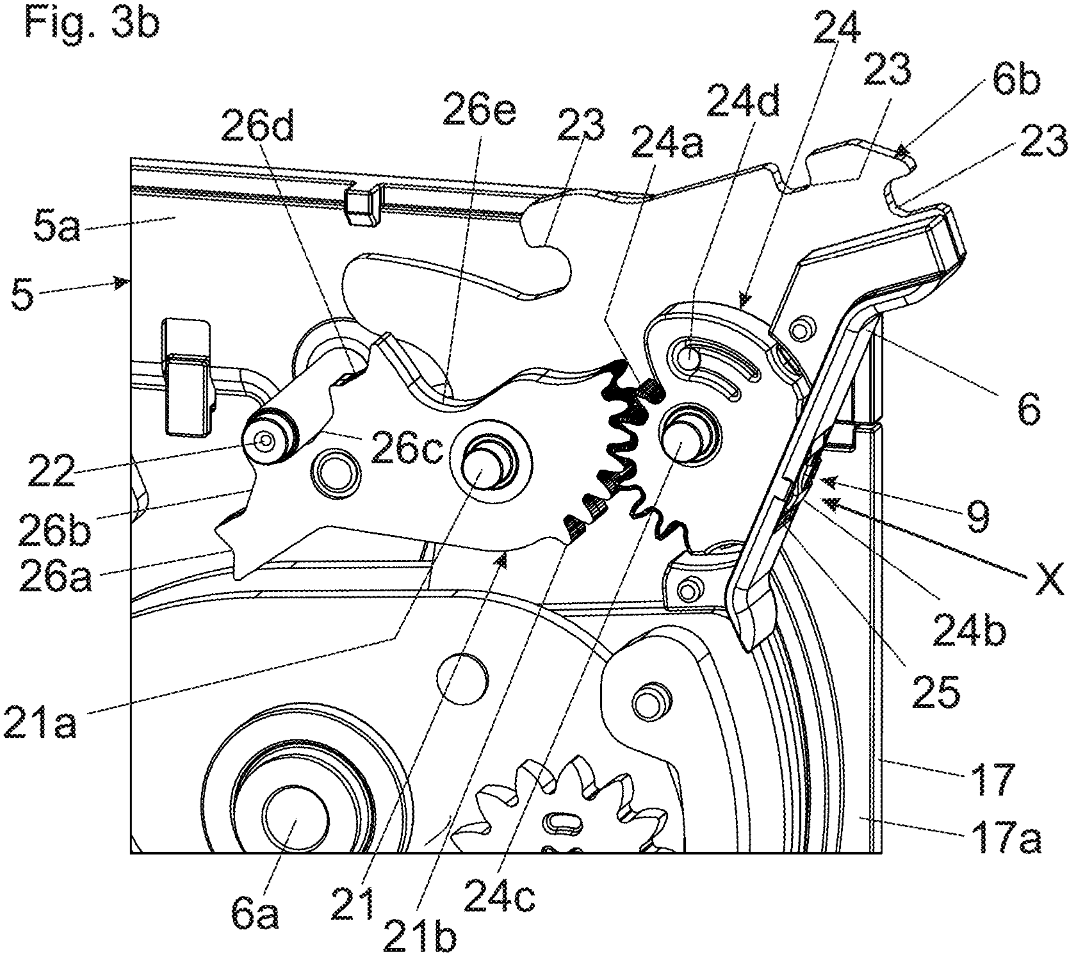

FIG. 3*b* shows the framed region of FIG. 3*a* in an enlarged view, in which the adjustment device 9 for adjusting the position of the maximum opening angle of the at least one actuating arm 6 emerges in greater detail.

The adjustment device 9 includes at least one pivoting member 21 configured to be moved in at least two pivoting positions relative to the at least one actuating arm 6, and the at least one pivoting member 21 is configured to distance the at least one actuating arm 6 in the at least two pivoting positions to a different extent from at least one abutment 22 arranged on the carrier 5 when the at least one actuating arm 6 is arranged in the maximum opening position.

Preferably, it can be provided that the at least one pivoting member 21

- is pivotable about a pivoting axis 21*a* extending parallel to the at least one pivoting axis 6*a* of the at least one actuating arm 6, and/or
- is pivotally supported on the at least one actuating arm 6, and/or
- includes two or more recesses 26*a*, 26*b*, 26*c*, 26*d*, 26*e* for partially receiving the abutment 22, and/or
- includes at least one tooth arrangement 21*b*, preferably configured as an eccentric tooth arrangement.

The different recesses 26*a*, 26*b*, 26*c*, 26*d*, 26*e* of the pivoting member 21 are thus configured to partially receive the abutment 22 and serve for limiting the maximum opening position of the actuating arm 6 on predetermined locations.

The adjustment device 9 further includes an actuating portion 24 which is connected in a movement-coupled manner to the at least one pivoting member 21. Preferably, the actuating portion 24

- is pivotally supported on the at least one actuating arm 6, and/or
- is connected in a movement-coupled manner to the at least one pivoting member 21 via at least one tooth arrangement 24*a*, 21*b*, and/or is configured to be immediately and directly actuated for manual actuation, and/or includes at least one circumferentially arranged actuating contour 24*b*, and it is particularly preferred that the actuating contour 24*b* is at least partially accessible for manual actuation through an opening 25 arranged or formed on the actuating arm 6, and/or includes at least one, preferably embossed, scale 29 (FIG. 5*b*, 5*d*) for reading the position of the maximum opening position of the at least one actuating arm 6, and/or includes at least one locking element 24*d*, preferably resilient or configured as a spring tongue, configured to releasably lock the actuating portion 24 in at least two different positions, and/or includes at least one tooth arrangement 24*a*, preferably in the form of an eccentric tooth arrangement.

By the size and geometry of the co-operating tooth arrangements 24*a*, 21*a*, the transmission ratio of a relative movement between the actuating portion 24 and the pivoting member 21 can be varied, for example, such that the pivoting member 21 can be pivoted about the pivoting axis 21*a* by a relatively small actuating portion 24 and without large manual effort.

The carrier 5 includes a front face 17 having at least one opening 17*a* through which the at least one actuating arm 6 projects in an open position. The actuating portion 24 can be actuated through the opening 17*a* from a direction (X) extending transversely to the front face 17.

Preferably, the at least one abutment 22:

is stationarily arranged on the at least one carrier 5, and/or is configured as a substantially cylindrical pin, and/or has a longitudinal axis extending parallel to the at least one pivoting axis 6*a* of the at least one actuating arm 6, and/or is configured as a stabilizing element configured to stabilize two housing walls 5*a* of the carrier 5, the two housing walls 5 of the carrier 5 extending parallel to one another.

The actuating arm 6 or the actuating arm appendix 6*b* includes at least two mutually spaced recesses 23 for partially receiving locking elements (not shown here), the locking elements being arranged on the actuating arm extension 11 (FIG. 2*a*).

In order for the actuating arm extension 11 to be mounted to the actuating arm 6, the following steps can be provided for example:

the actuating arm extension 11 is hung into a first recess 23 via a first locking element, the actuating arm extension 11, in a hung-in condition, is pivoted about an axis, and it is particularly preferred that the axis extends substantially horizontally in a mounted condition of the furniture drive 4 on the furniture carcass 2, the actuating arm extension 11 is releasably locked to the actuating arm 6 by a force of a second locking element pressurized by a force storage member, and the second locking element engages into a second recess 23 in a connected condition between the actuating arm extension 11 and the actuating arm 6.

Figure 4A:
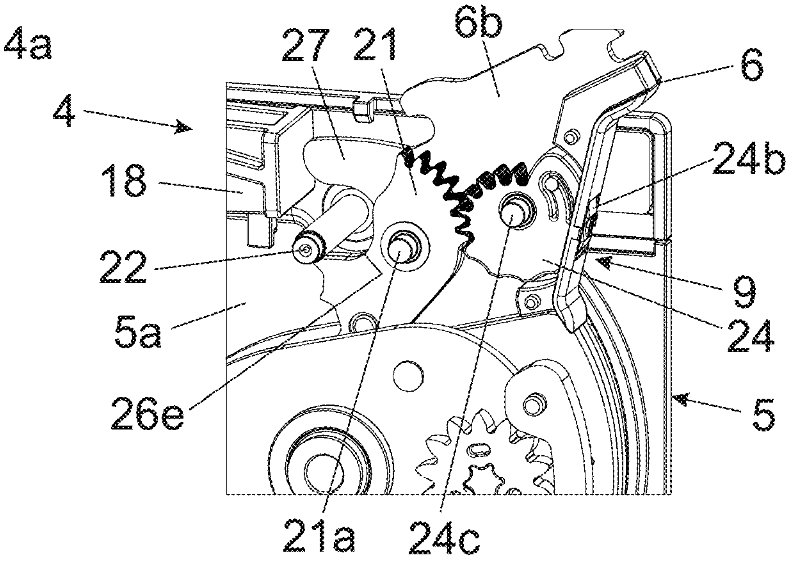
FIG. 4*a*-4*c* show the adjustment device for adjusting a position of the maximum opening position of the actuating arm, the actuating arm being located in different maximum opening positions.
Figure 4B:
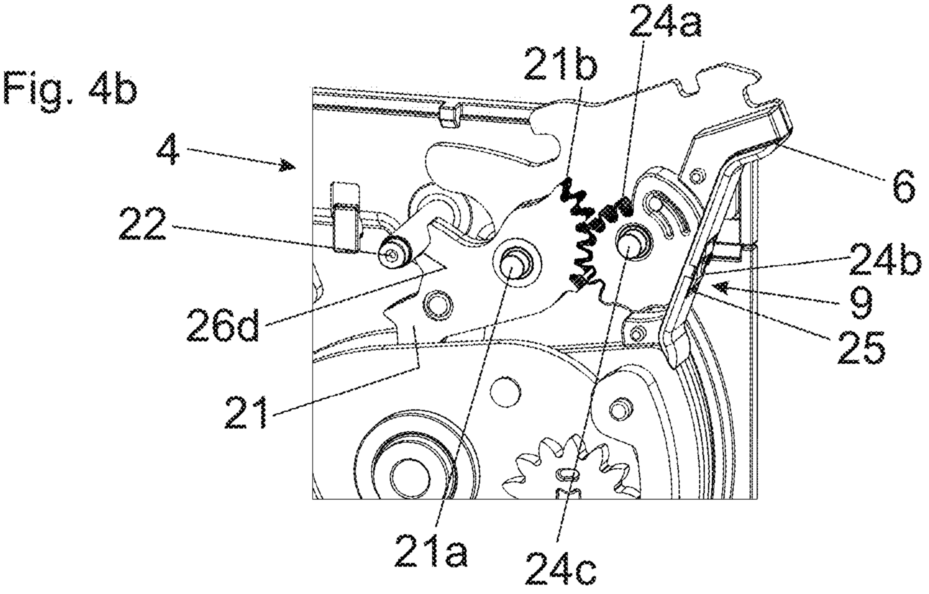
Figure 4C:
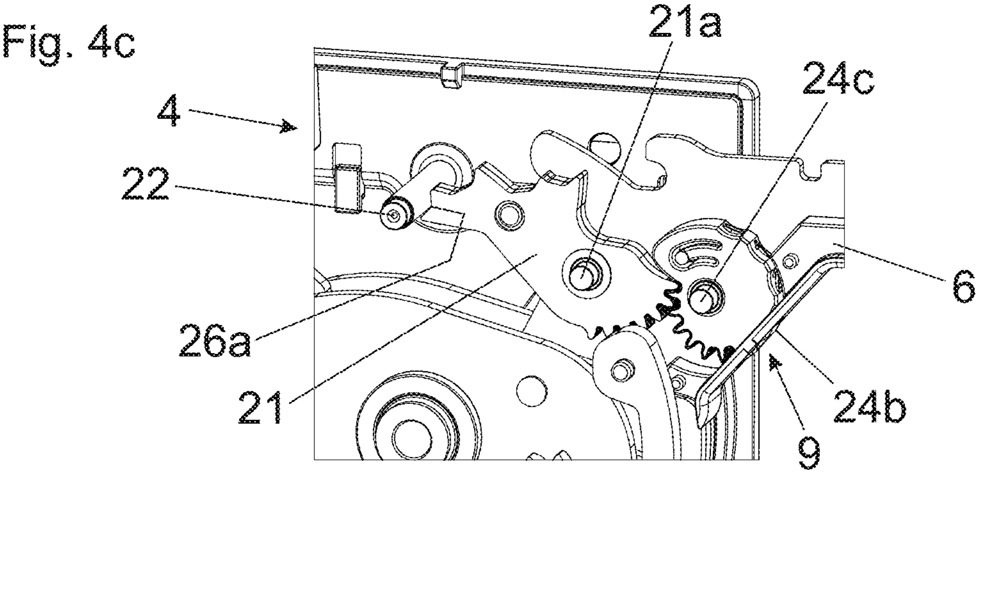

FIG. 4*a*-4*c* show the adjustment device 9 for adjusting the position of the maximum opening position of the actuating arm 6, the actuating arm 6 being located in different maximum opening positions.

In FIG. 4*a*, the stationary abutment 22 is located within the recess 26*e* of the pivoting member 21. As a result, the actuating arm 6 is positioned with a largest maximum pivoting angle relative to the carrier 5. It can be seen that the actuating arm 6 or the actuating arm appendix 6*b* includes an abutment element 27, and the damping device 18, preferably a piston-cylinder-unit, can be pressurized by the abutment element 27 upon an opening movement of the actuating arm 6. In this way, the last opening movement of the actuating arm 6 can be decelerated until reaching the fully open position.

FIG. 4*b* shows an intermediate adjustment of the maximum pivoting angle of the actuating arm 6, in which the abutment 22 is received within the recess 26*d* of the pivoting member 21.

FIG. 4*c* eventually shows the smallest adjustment of the pivoting angle of the actuating arm 6, in which the stationary abutment 22 is received within the recess 26*a* of the pivoting member 21.

Figure 5A:
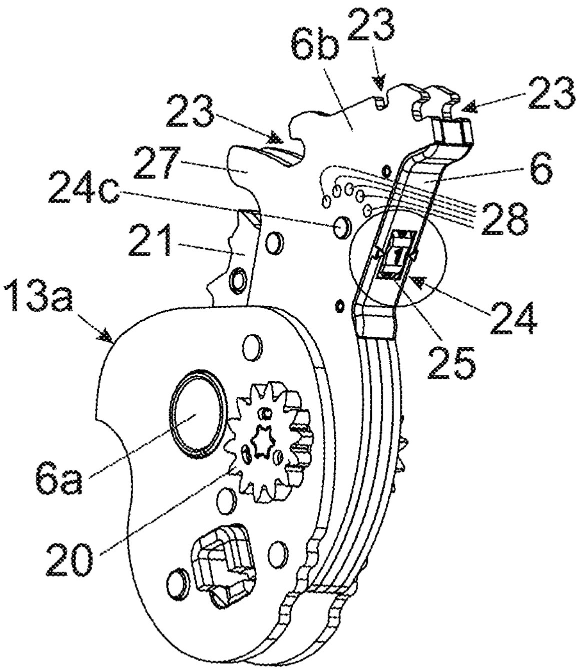
FIG. 5*a*-5*d* show the actuating arm in two different maximum opening positions and enlarged detail views thereof.

FIG. 5*a* shows the actuating arm 6 in the smallest maximum opening position. The actuating arm 6 is pivotally supported about the pivoting axis 6*a* and includes a control curve 13*a* configured to be eccentric relative to the pivoting axis 6*a*. The pressure roller 19 (FIG. 3*a*) pressurized by the spring device 10 is configured to run along the control curve 13*a*.

The actuating arm 6 is connected or is configured to be connected to the actuating arm appendix 6*b*. The actuating arm appendix 6*b* is configured to be releasably locked to the actuating arm extension 11 (FIG. 2*a*) via the recesses 23.

Two or more holes 28 are arranged on the actuating arm 6. In each of the holes 28, the locking element 24*d* (FIG. 3*b*) of the actuating portion 24 can be releasably locked. In this way, the actuating arm 6 can be positioned in at least two different maximum opening positions predetermined by the holes 28. In the shown embodiment, five holes 28 are provided by which five different maximum opening positions of the actuating arm 6 can thus be adjusted. Of course, the number of the holes 28 can be varied.

Figure 5C:
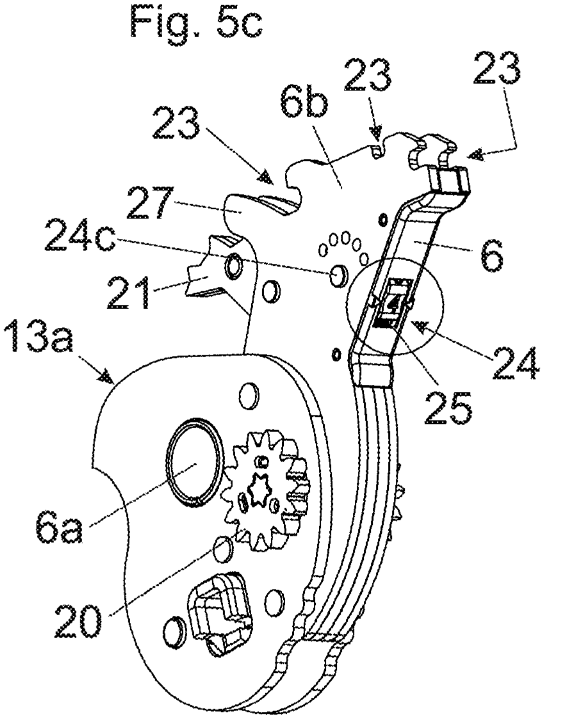
Figure 5B:
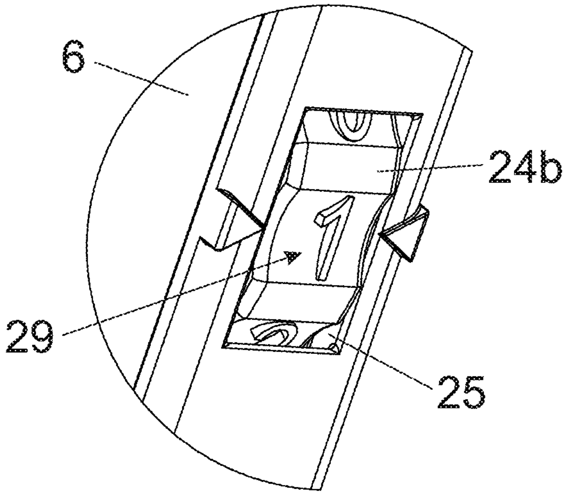

FIG. 5*b* shows the encircled region of FIG. 5*a* in an enlarged view. The opening 25 arranged on the actuating arm 6 can be seen, and the actuating contour 24*b* of the actuating portion 24 partially projects through the opening 25. By at least one, preferably embossed, scale 29, the adjustment of the maximum opening position of the actuating arm 6 can be read.

Figure 5D:
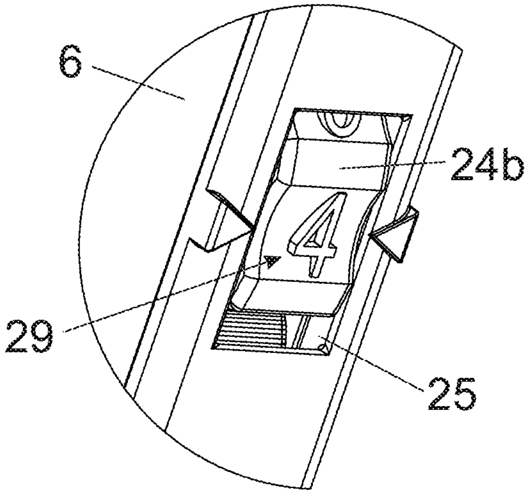

FIG. 5*c* shows the actuating arm 6 in a further maximum opening position. FIG. 5*d* shows the encircled region of FIG. 5*c* in an enlarged view.

Accordingly, the actuating arm 6 can be positioned in two or more maximum opening positions by the adjustment device 9. In order to vary the maximum opening position, the actuating arm 6 is to be slightly moved from a maximum opening position in a direction towards the closed position, whereupon the actuating portion 24 is to be manually pivoted about the pivoting axis 24*c*, preferably into one of the predetermined switching positions 1-5. Subsequently, the actuating arm 6 is again moved in the opening direction, and the abutment 22 can be selectively engaged with one of the recesses 26*a*, 26*b*, 26*c*, 26*d*, 26*e* of the actuating portion 24.

Figure 6A:
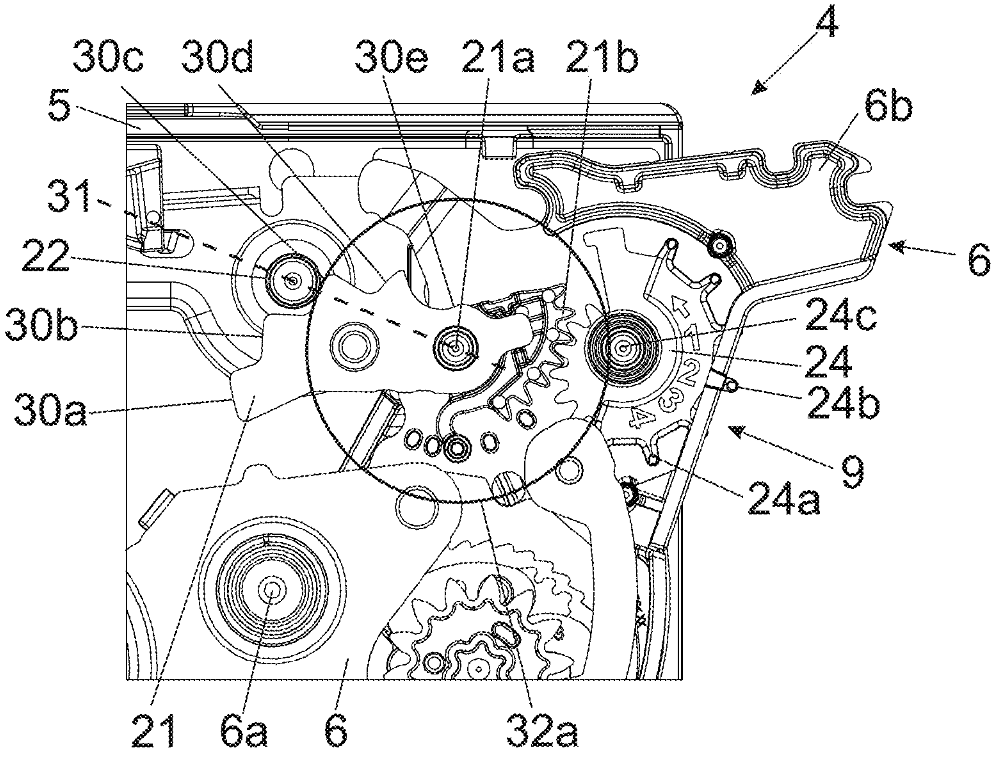
FIG. 6*a*, 6*b* show a furniture drive according to a slightly modified embodiment in two different positions of the pivoting member.
Figure 6B:
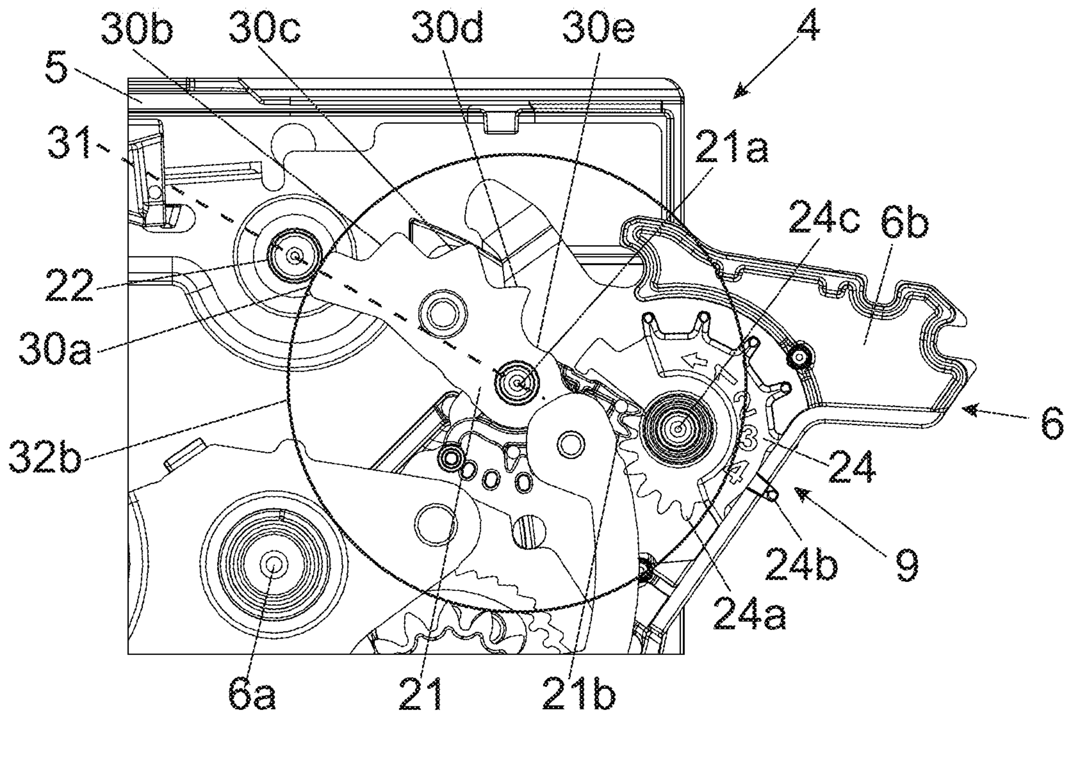

FIG. 6*a* and FIG. 6*b* show a furniture drive 4 according to a slightly modified embodiment in two different positions of the pivoting member 21.

The actuating arm 6 is pivotally supported about a pivoting axis 6*a* on the carrier 5, and the maximum opening position of the actuating arm 6 can be limited by the adjustment device 9. The adjustment device 9 includes the actuating portion 24 rotatable about the pivoting axis 24*c*, and the tooth arrangement 24*a* of the actuating portion 24 is in engagement with the tooth arrangement 21*b* of the pivoting member 21. The pivoting member is rotatable by a manual or by a tool-assisted pivoting movement of the actuating portion 24 so as to adjust the maximum opening position of the actuating arm 6 about the pivoting axis 21*a*.

In the previous embodiment, the pivoting position of the actuating member 21 has been fixed by the at least one locking element 24*d* (FIG. 3*b*), the locking element 24*d* being configured to be selectively received in one of the holes 28. However, the pivoting member 21 has the tendency to inadvertently pivot about the pivoting axis 21*a*, in particular when the actuating arm 6 is moved with a high speed in a direction of the opening position.

As an alternative or in addition to the at least one locking element 24*d*, according to the embodiment of FIGS. 6*a*, 6*b*, the at least one pivoting member 21 includes at least two curved-shaped bearing contours 30*a*, 30*b*, 30*c*, 30*d*, 30*e* configured to bear against the at least one abutment 22.

Each of the at least two bearing contours 30*a*, 30*b*, 30*c*, 30*d*, 30*e* corresponds to a circular arc of a notional circle 32*a*, 32*b* about the pivoting axis 21*a* of the pivoting member 21, and each of the two notional circles 32*a*, 32*b* has a different radius. The different radius of the two circles 32*a*, 32*b* can be well seen from a direct comparison between FIG. 6*a* with FIG. 6*b*.

In other words, the contact surface between the, preferably cylindrical, abutment 22 and a bearing contour 30*a*, 30*b*, 30*c*, 30*d*, 30*e* of the pivoting member 21 is each arranged on a notional connecting line 31 connecting the middle axis of the abutment 22 and the pivoting axis 21*a* of the pivoting member 21 with each other.

In this way, occurring tangential forces on the bearing contours 30*a*, 30*b*, 30*c*, 30*d*, 30*e* can be prevented and, therefore, no torque is applied to the pivoting member 21. Therefore, the pivoting member 21 is stably held on one of the bearing contours 30*a*, 30*b*, 30*c*, 30*d*, 30*e* in predetermined pivoting positions.

In the shown embodiment, the pivoting member 21 includes five different bearing contours 30*a*, 30*b*, 30*c*, 30*d*, 30*e* configured to fix the actuating arm 6 in five different maximum opening positions.

The invention claimed is:

1. A furniture drive for moving a furniture part movably supported relative to a furniture carcass, the furniture drive comprising:

- a carrier configured to be fixed to the furniture carcass,
- an actuating arm pivotally supported relative to the carrier about a pivoting axis between a closed position and a maximum opening position, and
- an adjustment device configured to adjust a position of the maximum opening position of the actuating arm,
- wherein the adjustment device includes a pivoting member pivotally arranged on the actuating arm, the pivoting member being configured to be moved into at least two pivoting positions relative to the actuating arm, the pivoting member being configured to position the actuating arm in at least two different maximum opening positions corresponding to the at least two pivoting positions, the two different maximum opening positions being located at different distances from a stationary abutment immovably arranged on the carrier, and
- wherein the pivoting member has at least two recesses configured to at least partially receive the stationary abutment.

2. The furniture drive according to claim 1, wherein the adjustment device includes an actuating portion connected to the pivoting member in a movement-coupled manner.

3. The furniture drive according to claim 2, wherein the carrier has a front face having an opening through which the actuating arm projects in an opening position, the actuating portion being configured to be actuated from a direction extending transversely to the front face.

4. The furniture drive according to claim 1, wherein the pivoting member:

- is pivotable about a pivoting axis extending parallel to the pivoting axis of the actuating arm, and/or
- includes a tooth arrangement.

5. The furniture drive according to claim 1, wherein the abutment:

- is configured as a substantially cylindrical pin, and/or
- has a longitudinal axis extending parallel to the pivoting axis of the actuating arm, and/or
- is a stabilizing element configured to stabilize two housing walls of the carrier, the two housing walls of the carrier extending parallel to one another.

6. The furniture drive according to claim 1, wherein the actuating arm includes an actuating arm appendix on which an actuating arm extension is releasably arranged.

7. The furniture drive according to claim 1, further comprising a spring device configured to apply a force to the actuating arm.

8. The furniture drive according to claim 7, further comprising a mounting securing device configured to limit an opening speed of a vacant actuating arm to which no movable furniture part has yet been fitted, the mounting securing device being configured to prevent an inadvertent opening or kicking-out movement of the vacant actuating arm caused by a force of the spring device.

9. The furniture drive according to claim 1, further comprising a damping device for dampening a movement of the actuating arm.

10. The furniture drive according to claim 7, further comprising a force adjustment device for adjusting a force of the spring device applied to the actuating arm.

11. The furniture drive according to claim 7, further comprising a transmission mechanism for transmitting a force of the spring device to the actuating arm, the transmission mechanism including a control curve and a pressure roller to be pressurized by the spring device, the pressure roller being configured to run along the control curve upon a movement of the actuating arm.

12. The furniture drive according to claim 1, wherein the pivoting member includes at least two curved-shaped bearing contours configured to bear against the abutment, each of the at least two bearing contours corresponding to a circular arc of a notional circle about the pivoting axis of the pivoting member, and wherein the two notional circles have different radii.

13. An item of furniture comprising:

- a furniture carcass,
- a furniture part movably supported relative to the furniture carcass, and
- the furniture drive according to claim 1 for moving the movably supported furniture part.

14. The furniture drive according to claim 2, wherein the actuating portion:

- is pivotally supported on the actuating arm, and/or
- is connected in a movement-coupled manner to the pivoting member via a tooth arrangement, and/or
- is configured to be immediately and directly accessible for manual actuation, and/or includes a circumferentially arranged actuating contour at least partially accessible for manual actuation through an opening arranged or formed on the actuating arm, and/or includes a scale for reading the position of the maximum opening position of the actuating arm, and/or includes a resilient locking element configured to releasably lock the actuating portion in at least two different positions, and/or includes an eccentric tooth arrangement.

15. The furniture drive according to claim 4, wherein the pivoting member includes the tooth arrangement, and the tooth arrangement is an eccentric tooth arrangement.

16. The furniture drive according to claim 6, wherein the actuating arm appendix includes at least two recesses spaced apart to partially receive locking elements arranged on the actuating arm extension.

17. The furniture drive according to claim 7, wherein the spring device includes a helical compression spring.

18. The furniture drive according to claim 8, wherein the mounting securing device includes a centrifugal clutch.

19. The furniture drive according to claim 9, wherein the damping device:

is a fluid damper, and/or includes a piston-cylinder unit, and/or is configured to be pressurized by the actuating arm upon a closing movement, and/or is configured to be pressurized from the same side both upon an opening movement and upon a closing movement of the actuating arm.

20. The furniture drive according to claim 10, wherein the force adjustment device includes:

a rotatably supported adjustment wheel, the adjustment wheel being configured to adjust a force of the spring device acting on the actuating arm, and/or a threaded spindle along which an engagement location of the spring device is movable upon an actuation of the force adjustment device, and/or a rotatably supported adjustment wheel, the carrier including a front face having an opening through which the actuating arm projects in an open position, and the adjustment wheel being configured to be actuated through the opening from a direction extending transversely to the front face.

21. A furniture drive for moving a furniture part movably supported relative to a furniture carcass, the furniture drive comprising:

a carrier configured to be fixed to the furniture carcass, an actuating arm pivotally supported relative to the carrier about a pivoting axis between a closed position and a maximum opening position, an adjustment device configured to adjust a position of the maximum opening position of the actuating arm, a spring device configured to apply a force to the actuating arm, and a mounting securing device configured to limit an opening speed of a vacant actuating arm to which no movable furniture part has yet been fitted, the mounting securing device being configured to prevent an inadvertent opening or kicking-out movement of the vacant actuating arm caused by a force of the spring device, wherein the adjustment device includes a pivoting member pivotally arranged on the actuating arm, the pivoting member being configured to be moved into at least two pivoting positions relative to the actuating arm, the pivoting member being configured to position the actuating arm in at least two different maximum opening positions corresponding to the at least two pivoting positions, the two different maximum opening positions being located at different distances from an abutment arranged on the carrier.

22. A furniture drive for moving a furniture part movably supported relative to a furniture carcass, the furniture drive comprising:

a carrier configured to be fixed to the furniture carcass, an actuating arm pivotally supported relative to the carrier about a pivoting axis between a closed position and a maximum opening position, an adjustment device configured to adjust a position of the maximum opening position of the actuating arm, a spring device configured to apply a force to the actuating arm, and transmission mechanism for transmitting a force of the spring device to the actuating arm, the transmission mechanism including a control curve and a pressure roller to be pressurized by the spring device, the pressure roller being configured to run along the control curve upon a movement of the actuating arm, wherein the adjustment device includes a pivoting member pivotally arranged on the actuating arm, the pivoting member being configured to be moved in into at least two pivoting positions relative to the actuating arm, the pivoting member being configured to position the actuating arm in the at least two pivoting positions to a different extent in at least two different maximum opening positions corresponding to the at least two pivoting positions, the two different maximum opening positions being located at different distances from an abutment arranged on the carrier.

23. A furniture drive for moving a furniture part movably supported relative to a furniture carcass, the furniture drive comprising:

a carrier configured to be fixed to the furniture carcass, an actuating arm pivotally supported relative to the carrier about a pivoting axis between a closed position and a maximum opening position, and an adjustment device configured to adjust a position of the maximum opening position of the actuating arm, wherein the adjustment device includes a pivoting member pivotally arranged on the actuating arm, the pivoting member being configured to be moved into at least two pivoting positions relative to the actuating arm, the pivoting member being configured to position the actuating arm in at least two different maximum opening positions corresponding to the at least two pivoting positions, the two different maximum opening positions being located at different distances from an abutment arranged on the carrier, and wherein the pivoting member includes at least two curved-shaped bearing contours configured to bear against the abutment, each of the at least two bearing contours corresponding to a circular arc of a notional circle about the pivoting axis of the pivoting member, and wherein the two notional circles have different radii.

24. A furniture drive for moving a furniture part movably supported relative to a furniture carcass, the furniture drive comprising:

a carrier configured to be fixed to the furniture carcass, an actuating arm pivotally supported relative to the carrier about a pivoting axis between a closed position and a maximum opening position, an adjustment device configured to adjust a position of the maximum opening position of the actuating arm, a spring device configured to apply a force to the actuating arm, and a force adjustment device for adjusting a force of the spring device applied to the actuating arm, wherein the adjustment device includes a pivoting member pivotally arranged on the actuating arm, the pivoting member being configured to be moved in into at least two pivoting positions relative to the actuating arm, the pivoting member being configured to position the actuating arm in at least two different maximum opening positions corresponding to the at least two pivoting positions, the two different maximum opening positions being located at different distances from an abutment arranged on the carrier, and wherein the force adjustment device includes:

a threaded spindle along which an engagement location of the spring device is movable upon an actuation of the force adjustment device, and/or a rotatably supported adjustment wheel, the carrier including a front face having an opening through which the actuating arm projects in an open position, and the adjustment wheel being configured to be actuated through the opening from a direction extending transversely to the front face.

* * * * *